UNITED STATES PATENT OFFICE 2,567,553

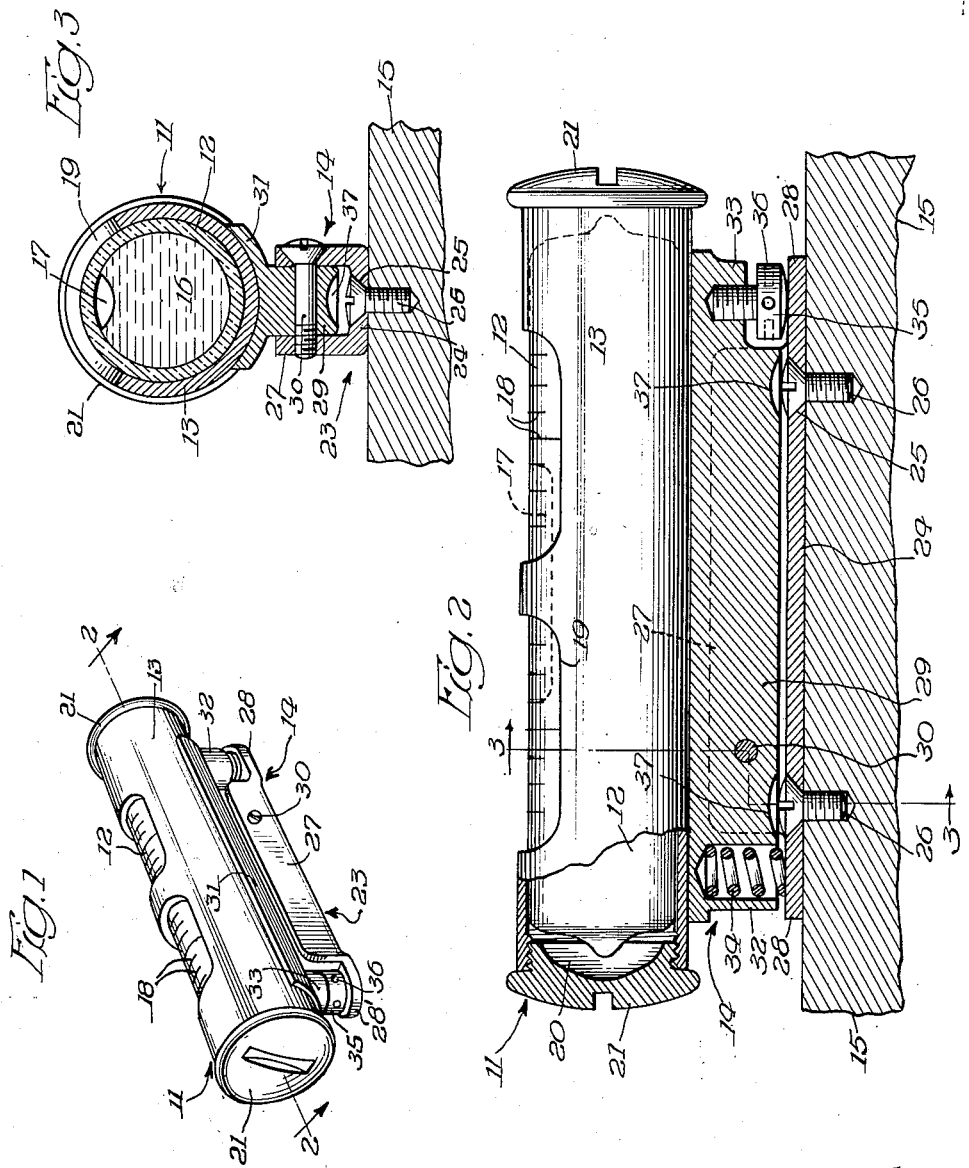

MOUNTING FOR SPIRIT LEVELS

Clarence P. Davey, Oak Park, Ill., assignor to Eugene Dietzgen Co., Chicago, Ill., a corporation of Delaware Application June 11, 1947, Serial No. 753,989

2 Claims. (Cl. 33—214)

The present invention relates in general to spirit levels and means for mounting and adjusting the same, the invention having more particular reference to a compact adjustable mounting especially well suited for supporting a spirit level in place in surveying and other precision instruments.

In mounting spirit levels in precision instruments such as transits, and the like, it is desirable, if not essential, to provide for adjusting the inclination of the level with respect to the instrument on which it is mounted. Spirit levels of the character mentioned usually comprise an elongated liquid vial enclosed in a usually metal housing having openings therein to reveal the air bubble in the vial, adjustment being afforded by adjustable mounting members supporting the opposite ends of the vial housing outwardly of the ends of the elongated vial element, as shown, for example, in U. S. Letters Patent 2,102,364 issued December 14, 1937.

Limitation of over-all length is often a prime consideration in spirit level structures used in precision instruments because of mounting space limitations inherent to the instrument in which the spirit level is mounted. Accordingly, where space considerations are important, in spirit levels having adjustable supports outwardly of the ends of the liquid vial, the vial itself necessarily has limited length which may be of the order of one-half to two-thirds, or less, of the over-all length of the mounted spirit level, it being desirable, of course, to utilize as long a vial as possible.

An important object of the present invention is to provide an adjustable spirit level wherein the ratio of length of the elongated vial to the over-all length of the liquid level structure may be of the order of 90%, or more, thereby providing maximum vial length in minimum space.

Another important object is to provide a mounting for supporting a spirit level member comprising an elongated vial carried in a housing, wherein the adjustable mounting is formed and arranged entirely at the side of the housing, whereby the vial may extend substantially throughout the housing and thus permit maximum vial length with respect to the over-all length of the assembly.

Another important object is to provide a spirit level comprising a vial and a tubular housing of simplified and improved construction, whereby the vial may be quickly and easily assembled, in securely mounted position, in the housing, as through an end thereof, and may be as readily removed for repair and replacement, the housing having an open end for the insertion and removal of the vial and a preferably screw threaded cover for said open end.

Another important object is to provide a spirit level having an elongated vial, a tubular housing for the vial, and adjustable mounting means whereby the housing and the vial therein may be accurately adjusted to a desired angularity on the mounting, the housing being carried by the mounting secured thereto between the opposite ends thereof.

Another important object is to provide a spirit level comprising an elongated vial and housing therefor, including an adjustable mounting comprising bracket means, a pivot connecting the housing on the bracket means intermediate the ends of the housing, and adjustable means operatively connected between the bracket means and the housing in position spaced from the pivot; a further object being to dispose the pivot and adjustable means intermediate the opposite ends of the housing.

Another important object is to provide the housing with a lateral radially extending lug or rib pivotally supported between spaced flanges of a support bracket whereby the housing is mounted for pivotal movement in a direction normal to the axis of the pivot; a further object being to dispose the adjusting means in position connected between the bracket means and the housing and spaced from the pivot, as near as possible to an end of the housing for maximum adjusting leverage.

Another important object is to provide spring means for urging the spirit level member, with respect to the bracket means, in one direction on the support pivot, while providing adjustable screw means, between the housing and the bracket means, in spaced relation to the pivot for adjustably tilting the level member on said support pivot against the influence of said spring.

Another object is to provide a spirit level including a housing tiltably mounted as by means of a pivot intermediate the ends of the housing in combination with spring and screw means on opposite sides of the pivot for accurately adjusting the angularity of the spirit level on its mounting bracket.

Other objects, advantages and inherent functions of the invention will become apparent as the same is more fully understood from the following description, which, taken in connection with the accompanying drawings, discloses a preferred embodiment of the invention.

Referring to the drawings:

Fig. 1 is a perspective view of a spirit level embodying the present invention;

Fig. 2 is a sectional view taken substantially along the line 2—2 in Fig. 1.

Fig. 3 is a sectional view taken substantially along the line 3—3 in Fig. 2.

To illustrate the invention the drawings show a spirit level 11 comprising an elongated liquid vial 12, a vial housing 13 of tubular configuration for snugly receiving the vial, and adjustable mounting means 14 for supporting the vial and its housing as on a mounting base 15.

The vial 12 preferably comprises a cylindrical shell of transparent material, such as glass, containing a suitable liquid 16 almost completely filling the shell in order to define an air bubble 17 adapted to shift within the vial as the same is tilted. The upper side of the shell may be provided with graduations 18, if desired, in order to accurately indicate the position of the bubble. The vial housing 13 preferably comprises a cylindrical shell, the internal diameter of which is formed to snugly receive the vial. The upper surface of the housing is provided with an opening or openings 19 through which the wall of the vial containing the graduations 18 is exposed when the vial is in mounted position within the housing. The vial may be assembled in centered position in the housing through either end thereof, and may be held in place as by means of cement 20 applied in the ends of the housing after the vial has been positioned therein. The opposite ends of the housing also may be internally threaded to receive cover caps 21 to retain the cemented vial in place and to impart a sightly end finish to the housing.

In the event that a vial should become damaged in service, it may be readily removed from the housing and replaced by removing the covers 21 and the cement 20, and pushing the damaged vial longitudinally out of the housing. Thereupon a replacement vial may be readily assembled and cemented in place in the housing, and the covers 21 replaced without dismounting or otherwise disturbing the spirit level or the instrument in which it is mounted.

It will be noted that the vial 12 may extend substantially throughout, that is to say, from end to end, of the housing 13 whereby the overall length of the housing including the cover caps 21 is but slightly greater than the length of the vial.

The mounting means 14 is attached to the housing along one side and intermediate the opposite ends of the housing, thereby adding nothing to the over-all length of the vial housing including the cover caps 21. To this end, the adjustable mounting means 14 may comprise a bracket 23 which conveniently may comprise a formed sheet metal strip having an elongated base portion 24, which may conveniently be provided with preferably countersunk openings 25 for the reception of fastening members 26 for the attachment of the bracket means on the supporting base structure 15. The bracket may also comprise a pair of spaced apart upstanding marginal flanges 27 which preferably, though not essentially, extend substantially throughout the length of the bracket, the base portion 24 of the bracket preferably extending, at the opposite ends thereof, beyond the opposite ends of the flanges 27 to provide bearing portions 28 and 28′ at opposite ends of the bracket for the accommodation of level adjusting means hereinafter more fully described.

The housing 13 is provided with a radially extending lug 29 on the side thereof vertically opposite from the openings 19, said lug preferably, although not essentially, extending between and throughout the length of the bracket flanges 27. This lug 29 is pivotally supported, for tilting movement between the flanges 27, on a pivot pin 30 which preferably comprises a bearing pin extending through an opening formed in the lug 29, said bearing pin preferably having a head supported in an opening in one of the flanges 27 and a screw threaded end having threaded connection in a threaded opening in the other of said flanges 27, whereby the lug 29 is journaled for tilting movement on the pin 30 intermediate the bracket support ends thereof.

The lug 29 is preferably formed integrally on an elongated curved plate 31 which may be welded or otherwise suitably secured to the housing 13. The plate 31 also preferably carries, at one end, a preferably integrally formed spring housing 32 and an integral mounting boss 33, at the other end of the plate 31, said spring housing and boss being in position registering with the bearing portions 28 and 28′, respectively, of the bracket. The spring housing 32 and the mounting boss 33, if desired, may be integrally formed with and at the opposite ends of the lug 29, if the same be formed as an elongated rib. Such integral construction of the plate 31, rib 29, spring housing 32 and boss 33, if employed, provides an exceedingly rugged structure which can be fabricated at exceedingly low cost.

The pivot 30 is desirably disposed between the spring housing 32 and the boss 33, the distance between the pivot and the spring housing being preferably shorter than the distance between the pivot and the boss.

The spring housing 32 provides a cavity in which a compression spring 34 may be mounted in position bearing at its opposite ends on the bearing portion 28 of the bracket, and on the plate 31 at the bottom of the spring socket, to thereby normally urge the housing 13 in one direction on the pivot pin 30. The embossment 33, being on the side of the pivot pin 30 remote from the spring 34, will be normally urged toward the bearing portion 28′ of the bracket with which said boss 33 is in registration. The boss 33 is provided with a threaded hole in which an adjusting screw 35 is threadingly engaged, said screw having a head in position to engage the bearing portion 28′ of the bracket; and the screw head may be provided with diametral channels 36 adapted for the insertion of a lever pin to facilitate the turning of the screw. By turning the screw in either direction the exact angularity of the housing 13 and the vial therein, under the urge of the spring 34, may be accurately adjusted.

The pivot pin 30 is preferably located in position such that the lever arm to the spring is approximately one-third of the lever arm between the pivot and the adjusting screw 35. It will be noted that the lug 29 need not be extended on opposite sides of the pivot pin 30 more than is necessary to accommodate said pivot pin. However, in the interests of rigid structure it is preferable to form said lug 29 as a rib extending between and integrated with the spring housing 32 and screw mounting embossment 33. Where the lug is thus extended it may be desirable to form cavities 37, therein, in position registering with the openings 35 in order to avoid engagement of the rib with the heads of the fastening elements 26. It is likewise obvious that the bracket flanges 27 need not be extended on opposite sides of the pivot pin 30 more than is necessary to accommodate said pin. In the interests of appearance, however, it is desirable to extend the bracket flanges 27 as shown, in order to provide a continuous closure for the space beneath the plate 31, between the spring housing and the screw mounting embossment, on the opposite sides of the lug 29.

In the illustrated embodiment the spring housing 32, the boss 33 and the lug 29 are connected to the housing of the bubble member, while the cooperating flanges 27 and bearing portions 28 and 28' are on the bracket. It will be obvious, however, that these parts may be transposed, individually or collectively, on the bubble and bracket members, without departing from the invention. The spring housing 32, the lug 29 and the boss 33 thus may be formed either on the bubble member or on the bracket member, and the flanges 27 and bearing portions 28 and 28' may be formed on either of the members in position to cooperate respectively with the lug, the spring housing and the boss.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A spirit level comprising an elongated bubble member, a channel member forming a support bracket having a pair of spaced parallel side flanges and a connecting web forming the bottom of the channel member, and having ends forming bearing lugs projecting beyond the ends of said flanges, at the opposite ends of the bracket, means forming a rib on and extending longitudinally of said elongated bubble member, said rib being sized to fit snugly between said spaced flanges and to extend at its opposite ends beyond the ends of said flanges, in position opposite said bearing lugs, a pivot pin mounted on and pivotally interconnecting said flanges and rib for supporting said bubble member for tilting movement on said bracket, said rib having a spring housing cavity therein and opening opposite one of said bearing lugs, a spring disposed in said cavity in position bearing oppositely on a said bearing lug and on said rib within said cavity, and an adjusting screw threaded in said rib at the end thereof remote from said cavity, said screw having a head in position bearing upon the other of said bearing lugs.

2. A spirit level comprising an elongated bubble member, a channel member forming a support bracket having a pair of spaced parallel side flanges and a connecting web forming the bottom of the channel member, said web having an end forming a bearing lug projecting beyond the ends of said flanges, at one end of the bracket, means forming a rib on and extending longitudinally of said elongated bubble member, said rib being sized to fit snugly between said spaced flanges and to extend beyond the ends of said flanges to form a seat at one end of said rib opposite said bearing lug, a pivot pin mounted on and pivotally interconnecting said flanges and rib for supporting said bubble member for tilting movement on said bracket, spring means bearing at opposite ends on said bracket and bubble member to normally urge the bubble member in one direction on said pivot pin with respect to said bracket, and an adjusting screw threaded in said rib at said seat, said screw having a head in position bearing upon said bearing lug and being turnable to adjust the relative angularity of the bubble member on said pin with respect to said bracket against the force of said spring.

CLARENCE P. DAVEY.

REFERENCES CITED

The following references are of record in the file of this patent:

UNITED STATES PATENTS

| Number | Name | Date |
| --- | --- | --- |
| 280,706 | Wood | July 3, 1883 |
| 544,587 | Moore | Aug. 13, 1895 |
| 565,096 | Traut | Aug. 4, 1896 |
| 565,097 | Traut | Aug. 4, 1896 |
| 767,392 | Dewaine | Aug. 16, 1904 |
| 1,278,148 | Heusser | Sept. 10, 1918 |
| 1,393,328 | Thullen | Oct. 11, 1921 |
| 2,301,769 | Babcock | Nov. 10, 1942 |